United States Patent
Choo et al.

(10) Patent No.: US 7,355,793 B2
(45) Date of Patent: Apr. 8, 2008

(54) OPTICAL SYSTEM APPLICABLE TO IMPROVING THE DYNAMIC RANGE OF SHACK-HARTMANN SENSORS

(75) Inventors: Hyuck Choo, Emeryville, CA (US); Richard S. Muller, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 136 days.

(21) Appl. No.: 11/133,455

(22) Filed: May 18, 2005

(65) Prior Publication Data

US 2005/0275946 A1 Dec. 15, 2005

Related U.S. Application Data

(60) Provisional application No. 60/572,794, filed on May 19, 2004.

(51) Int. Cl.
*G02B 27/10* (2006.01)
*G02B 26/00* (2006.01)
*G02F 1/00* (2006.01)

(52) U.S. Cl. .................................. 359/619; 359/237

(58) Field of Classification Search ............... 359/619, 359/237
See application file for complete search history.

(56) References Cited

U.S. PATENT DOCUMENTS

| | | | |
|---|---|---|---|
| 6,381,072 B1* | 4/2002 | Burger | 359/622 |
| 6,415,068 B1* | 7/2002 | Sun | 385/16 |
| 6,707,020 B1* | 3/2004 | Praus et al. | 250/201.9 |
| 6,819,413 B2* | 11/2004 | Neal et al. | 356/123 |
| 2001/0004420 A1* | 6/2001 | Kuwana et al. | 396/55 |
| 2002/0105699 A1* | 8/2002 | Miracky et al. | 359/159 |
| 2003/0227100 A1* | 12/2003 | Chandross et al. | 264/1.36 |

* cited by examiner

*Primary Examiner*—Alicia M Harrington
(74) *Attorney, Agent, or Firm*—Charles J. Kulas; Trellis Intellectual Property Law Group, PC (57) ABSTRACT

An addressable array of lenses is disclosed. Two electrical connections per row address specific lenses within that row. Carriages support individual lenses, thus forming resonant units with frequencies unique within each row. A voltage, having the same frequency as a selected resonant unit is applied. The selected lens produces a resonating image. Testing has verified proper resonance addressing within a 5-by-5 array of microlenses. The array can be applied to a Shack-Hartmann (SH) sensor. To compensate for errant images formed outside of their image area, resonating images are identified by a processor. The array thus improves the dynamic range of the wavefront aberration that can be measured by an SH sensor. The inventors currently estimate the improvement over conventional designs to be about a factor of 30.

23 Claims, 7 Drawing Sheets

OPTICAL SYSTEM APPLICABLE TO IMPROVING THE DYNAMIC RANGE OF SHACK-HARTMANN SENSORS

REFERENCE TO RELATED APPLICATIONS

This application claims priority from Provisional U.S. Patent Application 60/572,794 filed May 19, 2004 "Micro-Electromechanical Array Using Resonant Frequency for Device Selection", by Choo et al. This application is incorporated herein by reference for all purposes.

BACKGROUND OF THE INVENTION

Micro-scale lenses include, for example, lenses having a diameter ranging from about 4 millimeters (mm) down to about 20 micrometers or microns (μm). Microlenses have many valuable applications, which include but are not limited to, monitors for light beam distortion or wavefront aberrations for ophthalmic analysis systems and for adaptive optics systems for astronomy. Specifically, one type of useful application of a regularly spaced array of microlens is a Shack-Hartmann (SH) sensor.

Shack-Hartmann sensors are widely used to measure, and even to continuously monitor and correct, wavefront aberrations. Adaptive optical systems perform real-time corrections on wavefront aberrations. SH sensors are fast, accurate, and (in contrast to interferometers) generally insensitive to vibrations. When SH sensors are used in conjunction with adjustable optical devices, such as an array of small mirrors each of which can be adjusted, the image quality of a telescope can be very substantially improved. An adaptive astronomical telescope performs real time corrections on the wavefront aberrations which are always introduced as a beam of starlight traverses the earth's atmosphere.

Shack-Hartmann sensors have proven to be the most suitable wavefront monitors for ophthalmic analysis applications, such as used for keratoconus analysis (a disorder including having an eye with a cone shaped cornea), and for both before and after laser-assisted in-situ keratomileusis (LASIK) surgery. Fast measurement speed, relatively low light illumination levels, and extremely high accuracy are required when measuring the optical aberrations as a light beam passes through human eyes. Despite asking the patient to hold still, eyes are constantly moving at the scale of distance that is important in ophthalmic analysis.

Figure 1A:
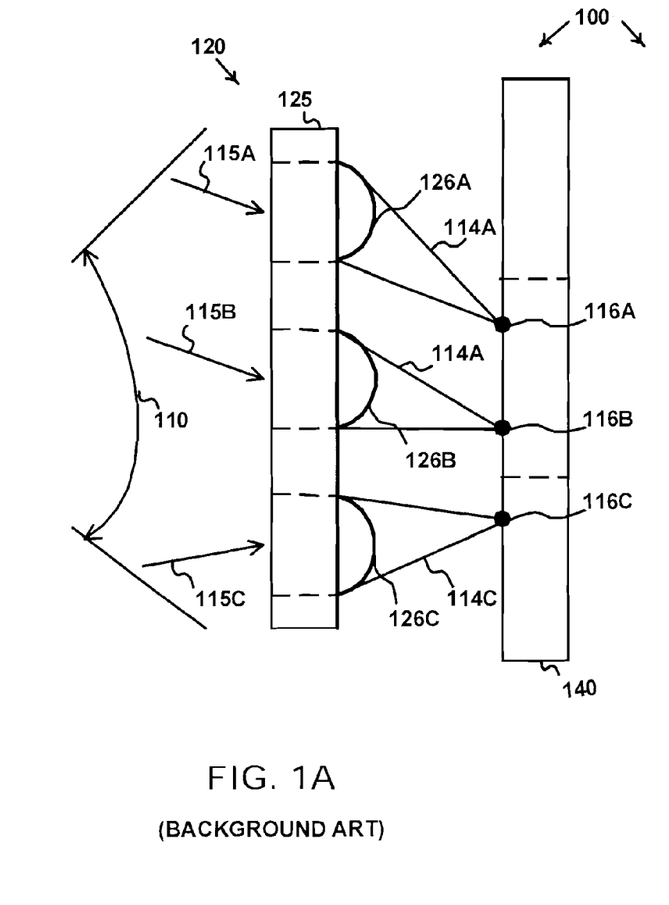
FIGS. 1A and 1B illustrate a conventional Shack-Hartmann (SH) sensor based on a microlens array, and how a light beam with high aberration is erroneously analyzed by such a sensor.
Figure 1B:
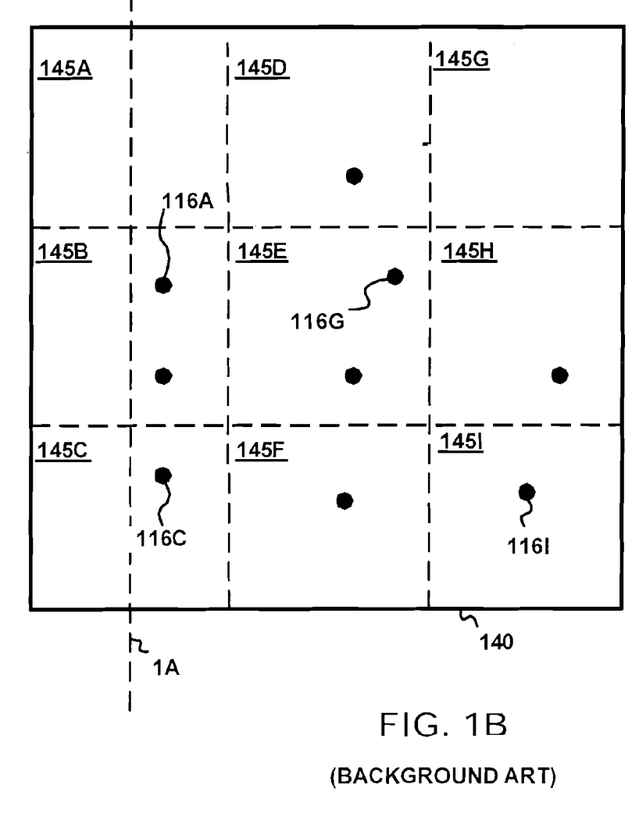

FIGS. 1A and 1B show a conventional Shack-Hartmann sensor according to the background art. These figures also show how a light beam with high aberration is erroneously analyzed by such a sensor. FIG. 1A is a cut away side view, where the cut is made along cut line 1A as shown in FIG. 1B.

SH sensor 100 includes a microlens array 120 comprising a handling layer 125 and a 3-by-3 array of microlenses 126. Microlens array 120 dissects incoming light beam 110 into a number of segments 114 and focuses each segment onto a spot or focal point 116. That is, each light bean segment 114 is diffracted by a corresponding lens 126 to produce a focal spot or image 116 on opto-electronic detector 140.

Detector 140 can be, for example, an array of charge-coupled devices (CCDs), or of complementary metal oxide silicon (CMOS) detectors. The detector area 145 that is assigned to each microlens is sometimes referred to as the microlens' sub-aperture. Since the microlens array and the detector array are typically both closely packed rectangular (or even more closely packed hexagonal arrays), each assigned area is comparable to the area of one of the microlenses. For example, the assigned area within a CCD may include around 40 CCD pixels formed by, for example, a 6 by 6 or a 7 by 7 array of pixels.

In FIG. 1A, the curvature or aberration of each segment 115 is represented by an arrow 115. Each arrow 115 is normal to the average direction of the wavefront of that particular light beam segment 114 at the plane where that particular segment is incident on array 120. Thus, the pattern of focal points 116 contains information about the waveform aberration.

This waveform aberration information is spatially resolved, and can be analyzed to reconstruct the wavefront over the area of micro lens array 120. If there were zero optical distortion in the path that light beam 110 takes from its source to array 120, then each arrow 115 would be horizontal and normal to the surface of array 120 and each focal point 116 would be at the exact center of its assigned area 145 within opto-electronic detector 140. In normal operation, the focal point of a microlens is not at the center of its assigned area, but it does fall somewhere within its assigned area. However beam 110, as shown in the example in FIG. 1, has high aberration.

The wavefront aberration of light beam 110 includes light beam segment 114A entering array 120 with a very large downward wavefront curvature, that is, downward with respect to the planes of FIGS. 1A and 1B. This is represented both by a large downward slope of arrow 115A and by the large downward displacement of focal point 116A. Segment 116A also has a slight rightward curvature represented by slightly off to the right position of focal point 116A, that is, rightward with respect to the plane of FIG. 1B. Similarly segment 116B has a moderate down and right curvature, represented by the moderate downward slope of arrow 115B and moderate down and right displacement of point 116B.

High aberration of a light beam can be produced by, for example: strong atmospheric disturbance of a light beam from a an astronomical source; defects in an optical device through which the light beam passes in an optics quality assurance or measurement system; or by optical defects in an eye (which is after all another form of an optical device) that is being evaluated in an ophthalmic-analysis system.

A problem arises, as shown in FIGS. 1A and 1B, when the wavefront aberration of the light beam incident on a microlens is large enough that the focal point falls outside of the microlens' assigned area and falls into the assigned area of a different, typically adjacent microlens. In such a situation, a false reading is likely to occur because the detector has no way to associate a focal-point reading with any microlens other than the microlens that is predetermined to be associated with the microlens' assigned area.

In today's world, it is highly desirable to expand the dynamic range of Shack-Hartmann sensors and to thus increasing the maximum amount of wavefront distortion that they can measure accurately. This is especially important in consideration of the ever increasing use of SH sensors in refractive surgery and in the research, diagnosis, and treatment of ophthalmic diseases. In the case of LASIK surgery, the development of a transition zone, formed by scar tissue, at the boundary separating surgically treated and untreated areas often results in very large optical aberrations over limited spatial regions. Ophthalmic conditions, such as keratoconus, require large dynamic ranges and sensitivities that cannot be fully achieved by conventional Shack-Hartmann sensors.

Another problem with respect to microlens arrays is to provide maximum fill-factor and clear aperture. A greater area of coverage of microlenses over the total area of the array, allows more efficient, accurate and sensitive measurements to be made.

Yet another problem is the precise, efficient, economical, and reliable fabrication of wavefront sensors, of the microlens arrays that are used in such sensors, and of the individual microlenses themselves.

SUMMARY OF EMBODIMENTS OF THE INVENTION

Embodiments of the invention provide mechanical structures that can be moved by the application of forcing functions. A grouping of individual structures are constructed such that each of them or, equally that a select number of them, has or have a unique and different mechanically resonant frequency from that of any other structure or select number of structures in the group. An oscillating forcing function (which may be imposed by electrostatic means, magnetic means, or any other suitable means) that is applied to all structures in the group will only have appreciable effect on whichever structure or structures have a resonant frequency that is close to or the same as the oscillation frequency of the forcing function.

An embodiment of the invention provides each lens in a microlens array with a different resonant frequency of vibration. All lenses in a given row of the array are connected between one pair of electrical lines. The electrical lines are driven by applied voltages that can be varied in their frequencies so that the single lens in the row with a mechanical resonant frequency that matches the driving-voltage frequency will vibrate while the other lenses in the same row remain essentially stationary. In this manner, a given lens can be "addressed". The lens vibration causes the focal point of the lens to be detected as a moving focal point that is sensed by a collection of detectors. Since the rest of the lenses in the array will have essentially stationary focal points, the moving focal point is known to be the focal point of the addressed lens. This scheme makes it possible to identify with certainty the lens through which a given segment of the incoming wavefront has passed. The address scheme described above can, of course, be sequentially applied to different rows in the array until all lenses in the array have been addressed.

In another embodiment of the invention, the lens carriages for each of the lenses are designed and built so that the mechanical resonance/movement of the lens when it is energized results in motions that can be varied at angles relative to one another. That is, a vibrating lens in the design described here, will have a line-shape at its focal plane and that line will be at an angle determined by the design of the lens carriage. The resultant detected signal can then be identified by the angle of the motion of the line formed by the moving focal point.

An embodiment provides for two electrical signals per row of lenses to vibrate the actuators for all lenses in the row. Only a lens with a resonant frequency near the vibration frequency will have appreciable movement. This allows the lens with the resonant frequency to be detected or selected. In a preferred embodiment a personal computer is used to direct application of the electrical signals to rows of an array and to scan signals from a detector array. The computer analyzes the detector readings and determines which lens focal point is vibrating significantly. The computer correlates the row to which the signal is applied with known vibration frequency that corresponds to a resonant frequency of a particular lens. The moving focal point localizes a range of possible focal points for the stationary lens which can then be read and associated with the particular lens even though the focal point may be far from its pre-assigned target detector area.

Another embodiment of the invention provides for shifting of the microlens array in relation to the collection of detectors. This allows a given microlens surface area to achieve a higher fill factor with respect to the surface area of the collection of detectors, or with respect to a wavefront area.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 3:
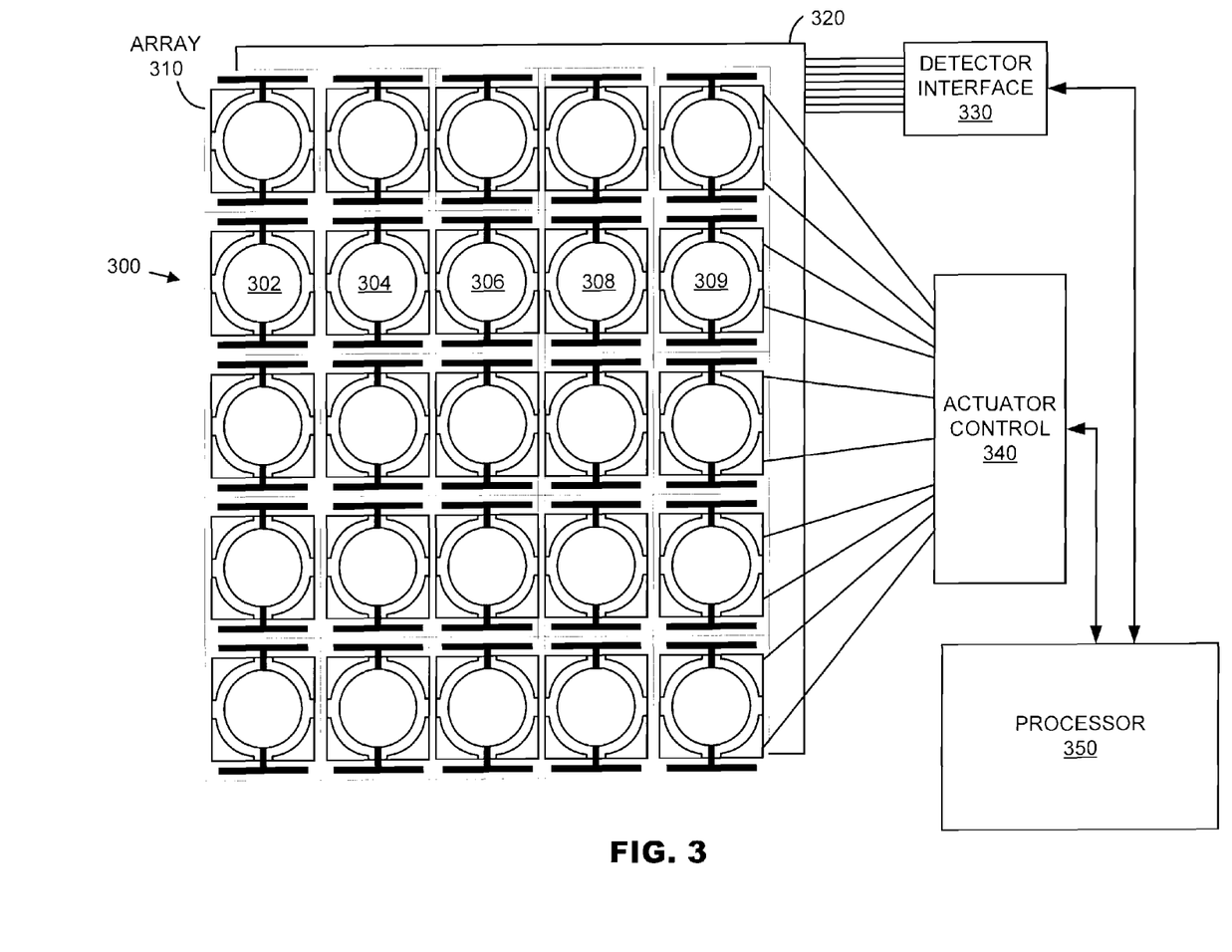
FIG. 3 illustrates an SH detector, including an array of resonating units and an addressing and detection control system, according to another embodiment of the invention.

Using MEMS technologies, a densely packed active microlens arrays that are individually controlled to resonate at given frequencies. When a lens resonates, its focal point will move parallel to its motional direction; hence by energizing one microlens in an array, we can identify its focal point by detecting a line instead of a point image for that lens (FIG. 3). The system is designed to have individual lens carriages for the array of lenses that have separated natural frequencies so that, by changing the frequency of the drive voltage, we require only two electrical connections per lens-carriage row to identify the selected lens.

The fabrication process of MEMS-microlens carriages is described with respect to FIG. 7, and can be summarized as follows: 1. Grow a 1 μm-thick thermal-silicon dioxide layer on a SOI wafer; 2. Pattern the layer to make a mask that will later define combs, flexures, supports, and lens frames; 3. Deep-reactive-ion-etch (DRIE) trenches that will be used to form anchors and electrical connections between the device layer and the handling layer of the SOI wafers; 4. Deposit a 0.5 μm-thick LPCVD polysilicon layer to create electrical contacts from the device layer to the handling layer (which serves as a GND) (the polysilicon layer also protects the oxide mask); 5. DRIE circular trenches in the device layer (these trenches will serve as wells for droplet microlenses later; 6. Deposit (using LPCVD) a 2-μm-thick silicon nitride layer (tensile stress, ~250 MPa) and pattern the layer; 7. DRIE silicon parts (combs, flexures, supports, and lens frame) using the silicon dioxide mask layer defined in step 2; 8. Open the backside of the wafers using DRIE to make clear apertures for microlenses; 9. Release the devices in concentrated HF; and 10. Make microlenses using polymer-jet printing technology (the boundary of the trench defines the diameter of the lens).

Figure 2:
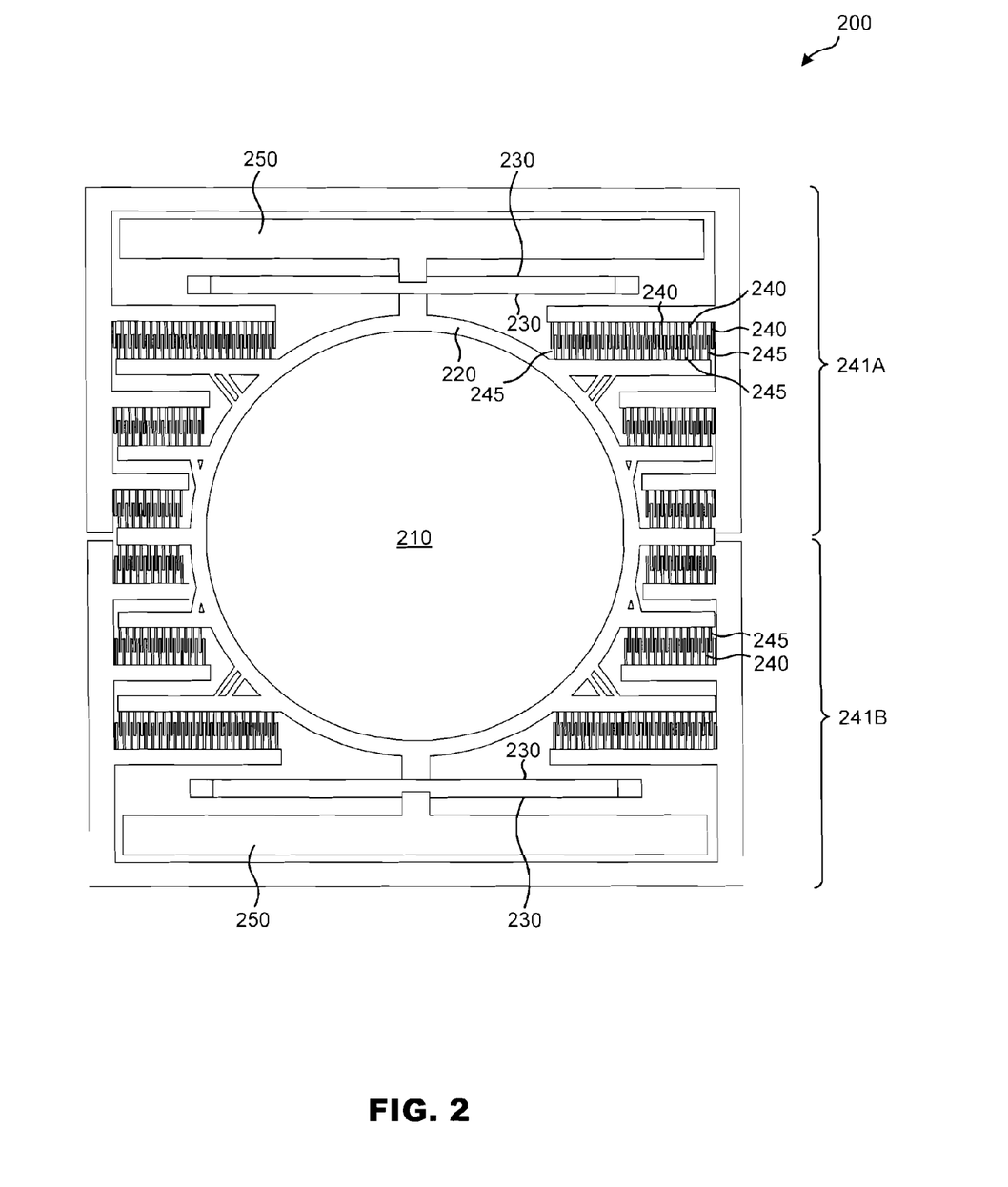
FIG. 2 illustrates a resonant unit, including a microlens and an actuator, according to an embodiment of the invention.

FIG. 2 illustrates a resonant unit, including a microlens and a carriage, according to an embodiment of the invention. As shown in FIG. 2, exemplary array cell 200 includes a resonant unit (also known as a lens/carriage assembly), stationary combs 240 and supports 250. The resonant unit includes a microlens 210 and a carriage. The carriage includes a lens frame 220, flexures 230, and moving combs 245. Flexures 230 flexibly link the carriage assembly to supports 250, which are secured to a handling layer (shown in FIG. 7).

Moving combs 245 are shaped and positioned to interleave with stationary combs 240. When a voltage is applied across combs 240 and 245, a force is generated upward or downward with respect to the plane of FIG. 2, depending on the polarity of the voltage. When an alternating current (AC) voltage is applied across the combs, the resonant unit resonated if the frequency of the AC voltage is close enough to the vibrational frequency of the resonant unit. The range of frequencies that are close enough is specified by the Q factor of the resonant unit.

Fixed combs 240 include two sets of fixed combs, each of which is electrically independent of the other. Combs 241A are above the resonant unit and combs 241B below the resonant unit. In an embodiment of the invention, one set of the fixed combs, say 241A, can be used to actuate the resonant unit, and at the same time the other set, say 241B, can be used to detect if each moving lens has reached its full amplitude when selected by sensing the change in capacitance between fixed combs 240 and moving combs 245. This is possible when the resonant frequency of each resonant unit in a row is previously measured and known and when only one of the resonant units moves within each row.

In another embodiment of the invention, some or all of the rows may have multiple resonant units that have the same resonant frequency. In this case, such resonant units should be separated by one or more resonant units having a different resonant frequency so that the individual resonant unit can be uniquely identified. The same consideration applies across rows, that is, the first resonant unit on adjacent rows should not have the same resonant frequency.

Within an individual array cell 200, which in one embodiment is 1360 μm by 1460 μm, two truss-joined double flexures maximize the resonant structures' pliability in the actuation directions while resisting instability in other directions. In order to maximize the area of clear aperture and the area for the actuators, the flexures are placed at the top and bottom of the unit, and comb-fingers are concentrated between the two flexures.

In a preferred embodiment, the physical properties of components of each resonant unit including the microlens, flexures and actuators can all contribute to the specific resonant frequency of the microlens. For example, mass, stiffness, geometry, mechanical relationship, etc., are properties of components that can act independently, or in concert with other components, to determine the resonant frequency. In a preferred embodiment, the geometry of the flexures, along with flexure mass and stiffness, as well as the mass of the microlens are the primary characteristics that determine the resonant frequency. In general, any inertial property of a structure can be set or predetermined and used to select, identify or otherwise affect the structure, particularly with respect to the structure's harmonic resonance response. In some embodiments, it may be useful to vary an inertial property of a structure.

Any characteristics of a structure or a collection of components can act to set a resonant frequency for a microlens. For example, mass can be added to the lens and its support system, or materials with different mechanical or physical properties can be used. Placing the microlens array in a gaseous, vacuum, or liquid medium would change the quality factor of the resonance. Using a different geometry for the lens-support system can also be used to fix a desired resonant frequency for a given lens. In general, any sufficient approach including means made possible by future technologies, can be used to set or affect the resonant frequency of an individual lens or other structure or component.

The actuation of the lenses can also be accomplished by using a magnetic drive instead of or, perhaps, jointly with the electrostatic method that we have described. If the actuators are provided with magnetically active materials, they can be set in motion under the influence of an external magnetic field. The magnetic field can be varied in frequency and, as in the case of electrostatic actuation, the lens having a mechanical resonance that matches the frequency of the external magnetic field will be set in vibration. Magnetic drive of this type has the advantage that electrical connections do not need to be made to an individual lens carriage.

Other means of actuation that can be frequency-varied in order to set a given lens system into vibratory motion are also possible. Another of possible methods is to use piezoelectric drive or thermal-expansion effects. Other actuation techniques, even including vibrating the entire lens system over a range of frequencies are possible with the frequency-selection scheme that we claim.

In a preferred embodiment a given row in the microlens array is electrically driven by voltage at a common frequency by applying electrical signals to the actuators of microlenses in the row. In other embodiments, any number of microlenses in any arbitrary grouping (e.g., rows, columns, blocks, groups of non-adjacent microlenses, etc.) can be used. For example, it is possible that multiple microlenses with separation between them greater than the largest possible dynamic range (e.g., microlenses 240 and 242, too far apart to have any optical cross-talk) can be vibrated at the same time and their focal points detected at the same or different time.

The actuators used in various embodiments of the invention may include: a voltage source and at least two conductors electrically coupled thereto, where the resonant components are positioned between the conductors and where the voltage has a frequency corresponding to the selected frequency; a current source and at least one conductor electrically coupled thereto, where the resonant components have a primary axis positioned orthogonal to the conductor and where the current has a frequency corresponding to the selected frequency; a vibrator mechanically coupled to the set of resonant components and having a vibration frequency corresponding to the selected frequency; or an electro-thermal heat source thermally coupled to the set of resonant components and having a frequency corresponding to the selected frequency. Each resonant unit may include a material selected from at least one of a piezoelectric material, a ferromagnetic material, a shape memory alloy, a pair of electro-thermal bimorph materials, or a thermo-pneumatic material.

The design of some embodiments of the invention has balanced the following considerations: 1. Maximize the clear aperture of the system (or microlens area) by minimizing the areas for actuators and interconnects; 2. Reduce mechanical cross-talk between different units as much as possible in order to avoid errors in identifying a lens and its associated focal point; and 3. Assure that only the desired lens moves appreciably while all other lenses in its row remain stable even when it must be actuated with the highest driving voltage. FIG. 3 shows a schematic diagram of a microlens array and an enlarged view of an individual MEMS-microlens unit.

With respect to FIG. 3, microlens array 310 has five rows of five resonant units each. Each microlens is formed within a lens-support carriage having a resonant frequency.

Details for fabrication methods of a microlens array according to embodiment of the present invention are provided below. Although specific fabrication steps and parameters are presented, many variations from these are possible. A preferred fabrication procedure uses a nitride membrane made of silicon rich, low stress nitride at a stress of less than about 300 MPa. The deposition condition is 100DCS/25HN3/140 mTorr/835° C. This compound is sometimes referred to as "Low-Stress Silicon Nitride".

This membrane can be used as a transparent bottom-floor for the formation of droplet polymer-microlens, or the membrane themselves can be patterned into diffractive/binary/refractive microlenses by using gray-scale photolithography with precision reactive-ion etching or ion-milling process or by using precisely-aligned multiple lithography steps with precision reactive-ion etching or ion-milling process. This membrane can also be formed not only by using low-stress silicon nitride layer, but also by using any material that is optically transparent in the wavelength region of interest, is mechanically robust, and is compatible with micro-fabrication technology.

In one embodiment, the invention includes a microlens array design where the microlenses are interspersed in cells in an array with actuators used to change the position of an associated microlens. The shifting of the microlens array can be achieved by standard micro-electromechanical systems (MEMS) actuators, or by any means as is known in the art. In a preferred embodiment, a piezoelectric MEMS actuator is used. In other embodiments the detector surface may be shifted instead of, or in addition to, shifting the microlens array.

In another embodiment, the invention includes a microlens design where the microlenses and actuators are placed in checkerboard pattern, and the document also shows the details of the measurement method where the entire array is shifted once, twice, or multiple times by the pitch of the array to complete the measurements. The shifting of the entire microlens array can be achieved by (but not limited to) large-displacement MEMS actuators or by integrating external piezoelectric actuators used in high-precision servo applications. The intention of creating this design is to improve the fill factor and thereby improving the accuracy of the system.

FIG. 3 also illustrates an addressing and detection control system according to a preferred embodiment. The microlens array includes row 300 of five microlenses 302, 304, 306, 308 and 309. Each row is provided with a pair of signals from actuator control 340. As described, each pair of wires serves to apply alternating voltages to pairs of actuators associated with each microlens. FIG. 3 is an expanded schematic view of a single lens/carriage assembly showing application of direct current and alternating current signals in a preferred embodiment. In FIG. 3, actuators 356 operate as a single actuator while actuators 358 operate as a single actuator. The combination of actuators 456 and 458 are the actuator pair associated with the lens/carriage assembly of microlens 380. The signals AC and AC* are alternating current signals that are 180 degrees out of phase.

Returning to FIG. 3, the application of signals from actuator control 340 to a row's actuators causes a single lens/carriage assembly to resonate. Detector grid 320 is used to sense the resonating lens/carriage assembly by detection of a focal point light transmission applied to the grid. In a preferred embodiment, a detector part number jAi50IR from jAi Designs is used. However, any suitable detector can be employed.

Detector interface 330 is used to obtain frames, or snapshots, of detector data and to provide the frames to processor 350. By analyzing the frames of data the processor is able to determine a position of a focal point (or focal points) within the grid. Also, analysis allows a moving focal point to be detected as, left undisturbed, lens' focal points will be stationary. Since processor 350 also controls application of actuator signals to rows in the microlens array, processor 350 is able to associate a moving focal point with a specific lens. In this manner a focal point that is outside of a small target region on the grid can still be detected and identified as belonging to a specific lens.

Relevant parameters of the MEMS-microlens units include the following: Number of moving comb-fingers per unit length 172; Length (lc) and width (wc) of comb-fingers (μm) 60, 5; Length (lf) and width (wf) of flexures (μm) 500, 600, 700, 800, and 900 across a row of the array; Density of microlens material (g/cm3) 1.08; Gap between comb-fingers (gcomb) (μm) 3; Refractive index of microlens material (n) 1.51; Thickness of SOI-wafer device layer (tSOI) (μm) 2; Thickness of SOI-wafer buried-oxide-layer (tBOX) (μm) 2; Diameter of microlens (Dlens) (μm) 800; and Focal length of microlens (flens) (mm) 2.

In order to achieve the definite assignment of a microlens and its focal point, the resonant peak of each MEMS-microlens unit should be sufficiently separated from the resonant peaks of the other units in the row in the frequency domain. This requirement imposes a limit on the number of MEMS-microlens resonant units that can be placed in a single row without sacrificing the merits of the frequency-addressing algorithm. The total number of the units that can be placed in a row is determined by: a) the upper and lower limits on the resonant-frequency range, and b) the quality factors of the resonant units in the row.

The resonant frequency of each MEMS-microlens unit is calculated by using the following equation:

$$f_r = \frac{1}{2 \cdot \pi} \sqrt{\frac{k}{M}} \quad (\text{Eq. 1})$$

where M is the total mass of the MEMS-microlens resonant unit, k is the total flexure stiffness.

M is given by:

$$M = M_{Moving\ structure} + 0.3714 \cdot M_{Flexures} + M_{Lens} \quad (\text{Eq. 2})$$

where $M_{Moving\ structure}$ is the mass of the silicon frame (+nitride membrane) on which microlens is mounted, $M_{Flexure}$ is the effective mass of the flexures, and $M_{Lens}$ is the mass of the polymer lens.

As is known in the art, the stiffness k of the flexures is calculated by using a simple beam theory:

$$k_{y\text{-}flex} = \frac{16 \cdot t_{SOI} \cdot w_f^3 \cdot E_{Si}}{l_f^3} \quad (\text{Eq. 3})$$

where $k_{y\text{-}flex}$ is the flexure stiffness in y-direction, $t_{SOI}$ is the thickness of the device layer of the SOI wafer, $w_f$ is the lateral (horizontal) width of the flexures, $l_f$ is the length of the flexures, and $E_{Si}$ is the Young's modulus of single-crystal silicon.

After choosing the design values that bracket upper and lower resonant frequencies of the MEMS-microlens units in a given row, we can calculate the total number of units having addressable resonant frequencies that can be placed in the row. The mechanical quality factor Q for the resonant carriages is $$Q = \frac{\sqrt{k \cdot M}}{b} \quad (\text{Eq. 4})$$

where M is the total mass of the MEMS-microlens resonant unit, k is the total flexure stiffness, and b is the damping factor due to the air surrounding the structure. This damping factor can be approximated from design and fabrication parameters (including over-etching that may occur during fabrication), or may be measured from the behavior of an actual resonant unit.

Table 1 sets forth device parameters measured from a prototype array that has been fabricated and tested.

TABLE 1

Measured Parameters of a Prototype Microlens Array

| Unit | Flexor length lf (μm) | Flexor width wf (μm) | Resonant frequency fr (kHz) | Quality Q |
|---|---|---|---|---|
| 1 | 900 | 4 | 1.56 | 116 |
| 2 | 800 | 4 | 1.88 | 140 |
| 3 | 700 | 4 | 2.33 | 172 |
| 4 | 600 | 4 | 3.00 | 220 |
| 5 | 500 | 4 | 4.05 | 296 |

Although the microlens array and collection of detectors are presented as rectangular arrays, other types of arrangements for both the microlenses and detectors are possible. In general, features of the present invention can be adopted for use with any arrangement of two or more microlensenses in a known relationship to a detection area that includes any number and type of detectors. Many other variations from the embodiments discussed herein will be apparent to one of skill in the art.

Figure 4:
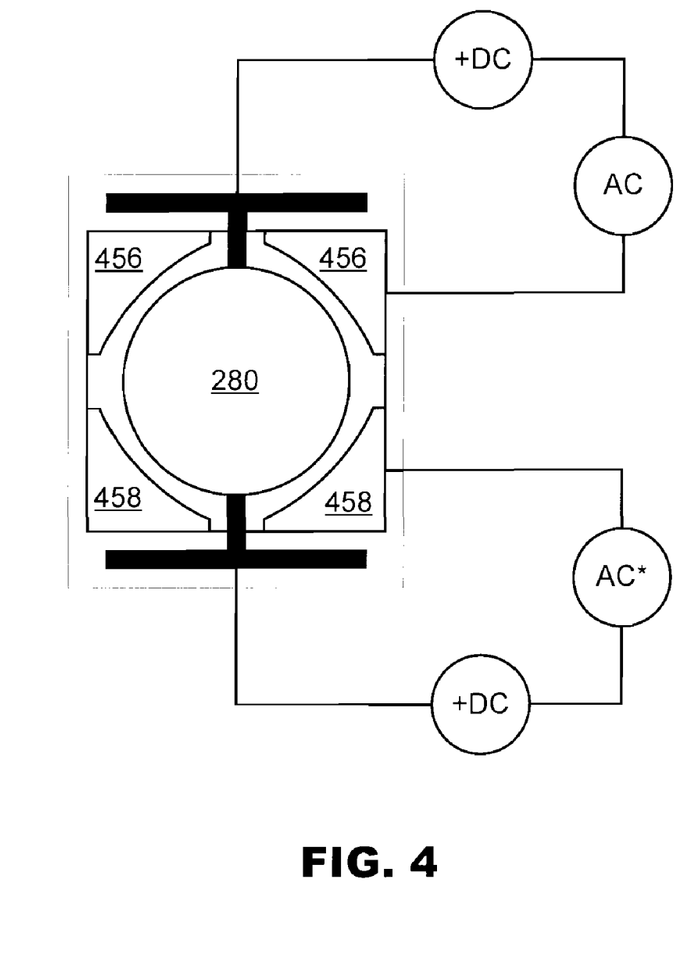
FIG. 4 is an expanded schematic view of a single lens/carriage assembly showing application of direct and alternating current signals, according to yet another embodiment of the invention.

FIG. 4 shows how an activation voltage is applied to an array cell. AC voltage AC, and its inverse voltage AC* are applied, respectively to the stationary combs on opposite sides of the array cell. Each of AC and AC* are offset by a direct current (DC) voltage that acts as a bias across the metallic junctions within the actuators.

Figure 5A:
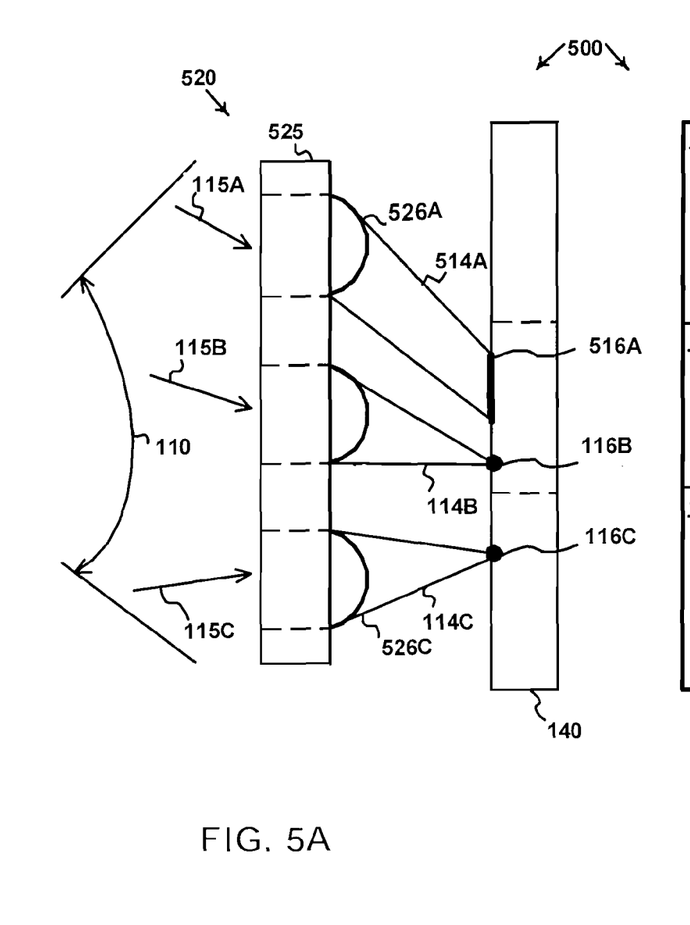
FIGS. 5A and 5B illustrate a Shack-Hartmann detector based on a microlens array according to an embodiment of the invention.
Figure 5B:
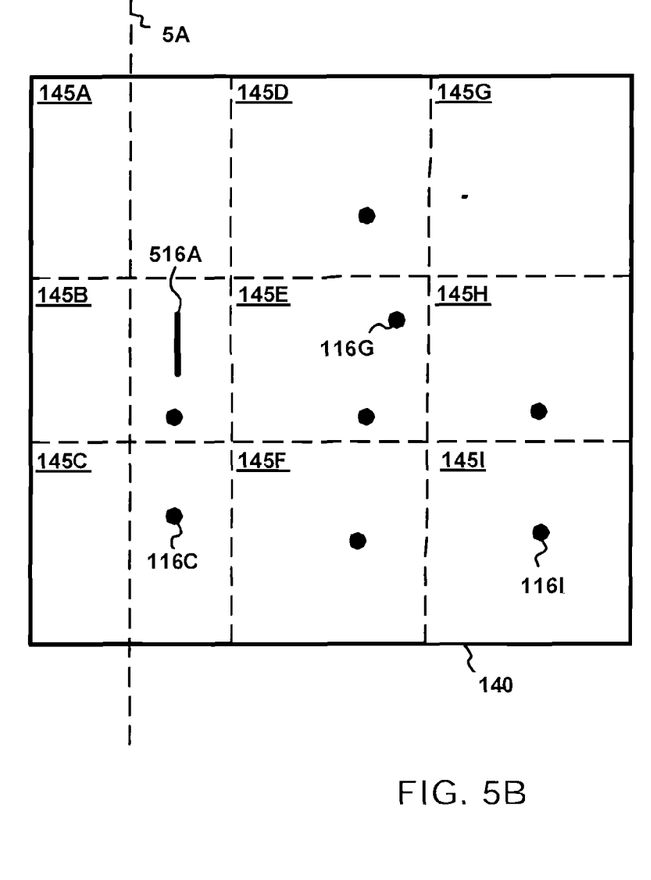

With respect to FIG. 5, by making each microlens resonate individually, the associated focal point can be identified, even if the focal point is located outside the assigned area. Through this design, a lens focal point can be identified outside its associated sub-aperture (usually 40 pixels for Shack-Hartmann sensors for ophthalmic analysis), anywhere in the sensing array. This identification will allow the dynamic range of the Shack-Hartmann sensor to be dramatically improved—a factor of 26 to 46 better than that achieved in conventional Shack-Hartmann systems.

FIGS. 5A and 5B show, in a manner similar to that of FIGS. 1A and 1B, a Shack-Hartmann sensor according to an embodiment of the invention. Unlike FIGS. 1A and 1B, FIGS. 5A and 5B show how a light beam with high aberration is correctly analyzed by this embodiment. FIG. 5A is a cut away side view, where the cut is made along cut line 5A as shown in FIG. 5B. Except as described below, the features and functions shown in FIGS. 5A and 5B are equivalent to those of FIGS. 1A and 1B.

SH sensor 500 includes a microlens array 520 comprising a handling layer 525 and a 3-by-3 array of microlenses 526. In one embodiment of the invention, array 520 and its components are similar in form and function to that array 310.

Microlens array 520 dissects incoming light beam 110 into a number of segments and focuses each segment onto a spot or focal point. Light beam segments 114B through 114I and focal points 116B through 116I are equivalent in FIGS. 1A, 1B, 5A, and 5B. However, to identify the location of focal spot 516A, lens 526A and its associated carriage is selected and made to vibrate. This produces a substantial and easily detectable elongation in focal point 516A.

Thus, information about the waveform aberration the pattern of focal points 516A and 116B through 116I contains can be accurately analyzed regardless of the amount and direction of displacement of focal point 516A.

Algorithms for correctly analyzing SH sensor data when individual focal points can be identified are known in the art.

Figure 6:
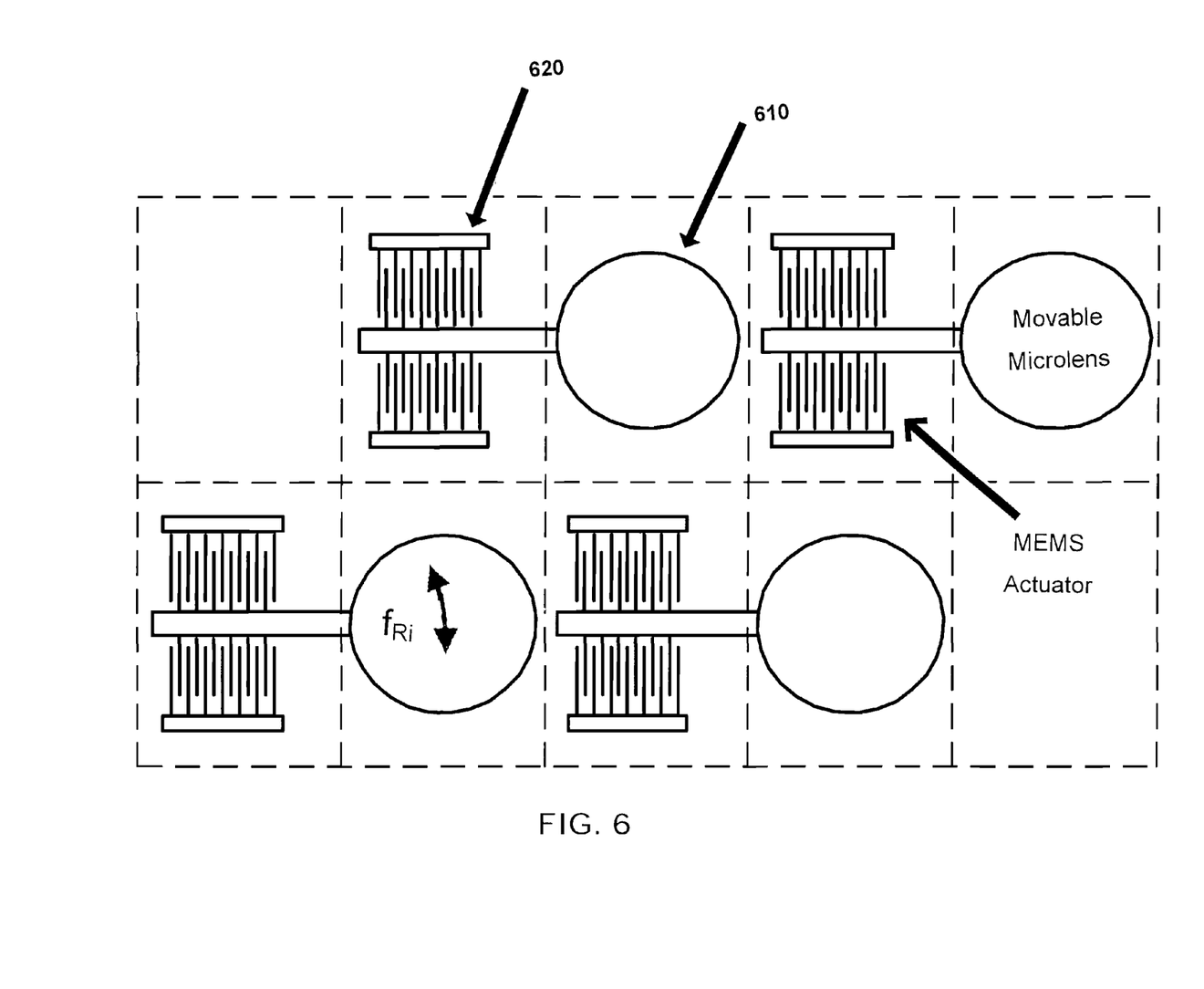
FIG. 6 illustrates a microlens array according to another embodiment of the invention.

In the embodiment of the invention shown in FIG. 6, a resonant unit includes two square units as, e.g., lens square 610 and actuator square 620. By using the array in the position shown in FIG. 6, shifting the array (e.g., to the right) by one square and then using the array again, the overall fill-factor, the clear aperture, and the spatial resolution of the addressable microlens array can be greatly improved. Also in this embodiment, the microlens diameter has been reduced by a factor of 4, compared to the embodiment of FIG. 2, that is, from 800 to 200 µm.

In order to measure high-order optical aberrations precisely, optical engineers try to maximize the fill-factor and the clear aperture of the microlens arrays used in Shack-Hartmann sensors. The high fill-factor with a large clear aperture also greatly improves the spatial resolution of the measurements as well as the light sensitivity of the system, making it possible to measure the wavefronts generated by dim objects such as stars. The fill-factor is defined as the ratio of the area of the microlenses to the total area of the microlens array. And, the clear aperture is defined as the ratio of the transmissive area of the microlenses to the total area of the microlens array.

In this shifted array approach, a first measurement is made by capturing the locations of the focal points of the microlenses. Each microlens is resonated to identify its associated focal point if necessary. The first measurement is stored and then the entire microlens array is shifted exactly by one square of pitch. Next, a second measurement is made at the new position. Again, as for the first measurement, each microlens is resonated to identify its associated focal point if necessary. Finally, the first and second measurements (focal point locations) are combined and analysis is performed.

This design can yield a fill factor of approximately 80% and clear aperture of 75%. Also, the small size of the microlenses, which are approximately 200 µm in diameter, results in the spatial resolution five times larger than that of the previous design. The spatial resolution and clear aperture of this new system can be further improved by decreasing the shifting distance. In other words, instead of shifting the array by one pitch, we can shift it by ½-, ⅓-, or ¼-pitch, respectively. Having this flexibility in shifting scheme enables us to obtain a clear aperture close to 100% and a spatial resolution less than 40 µm. Also using microlenses of smaller diameter will also improve the clear aperture and spatial resolution.

The shifting of the entire addressable lens array (second design/concept) can be achieved by using external forcing element or integrated MEMS actuators. For example, one can use: 1. high-precision step motors that are used in equipment such as photolithography-stepper stages and x-y-z micromanipulators. In this case, the lens array will be mounted and moved; 2. large-displacement MEMS actuators (electrostatic, electromagnetic, or electro-thermal) integrated on one or more edges of the outer frame of the microlens array to achieve the necessary displacement; and 3. shape-memory alloy having a fast response time, on the order of a few milliseconds.

Precision movement of MEMS structures are known in the art. Some of these are based on capacitance feedback, similar to that discussed above with respect to stationary combs 245 of FIG. 2.

The fill-factors and the clear apertures of stationary (conventional) microlens arrays used in commercially available Shack-Hartmann sensors are as high as 98% and 80%, respectively. The design of FIG. 2 yields approximately 45% fill-factor and 35% clear aperture because each square-unit contains a movable microlens and the associated MEMS actuators, as shown in FIG. 1.

In contrast, the design of FIG. 6 yields a fill factor of approximately 80% and clear aperture of 75%. Also, the small size of the microlenses, which are approximately 200 microns in diameter, results in the spatial resolution five times larger than that of the previous design. The spatial resolution and clear aperture of this new system can be further improved by decreasing the shifting distance. In other words, instead of shifting the array by one pitch, we can shift it by ½-, ⅓-, or ¼-pitch, respectively. Having this flexibility in shifting scheme enables us to obtain a clear aperture close to 100% and a spatial resolution less than 40 microns. Also using microlenses of smaller diameter will also improve the clear aperture and spatial resolution.

In order to measure high-order optical aberrations precisely, it is desirable to maximize the fill-factor and the clear aperture of the microlens arrays used in Shack-Hartmann sensors. The high fill-factor with a large clear aperture can also greatly improve the spatial resolution of the measurements as well as the light sensitivity of the system, making it possible to measure the wavefronts generated by dim objects such as stars. The fill-factor is defined as the ratio of the area of the microlenses to the total area of the microlens array. And, the clear aperture is defined as the ratio of the transmissive area of the microlenses to the total area of the microlens array.

The fill-factors and the clear apertures of stationary (conventional) microlens arrays used in commercially available Shack-Hartmann sensors are as high as 98% and 80%, respectively. Microlens array 310 of FIG. 3 has approximately a 45% fill-factor and 35% clear aperture because each square-unit contains a movable microlens and the associated MEMS actuators. FIG. 6 shows a microlens array design with an improved fill-factor (although this is not immediately apparent from the static FIG. 6).

In high-precision applications capacitive sensing can be used to make displacement measurements in the femtometer range. Optical measurements are made when all the microlenses are at rest (stationary). In other embodiments, different shapes and arrangements of mirrors, actuators and other components can be used to varying advantage with respect to fill factor, clear aperture, spatial resolution and other performance parameters. In some embodiments, less than the entire array may be selectively shifted or moved. Movement of the array can be in any direction or path.

In an embodiment of the invention, a resonance addressable microlens array is formed in two basic types of steps. First, MEMS-microlens carriages are formed by using, for example, a standard silicon-MEMS process. Next, direct fabrication of microlenses on the MEMS carriages is accomplished by using polymer-jet printing technology. Although specific steps, processes and techniques for fabrication are presented, deviations can be made without departing from the scope of the invention. For example, other than polymer-jet printing may be used to form the lens in alternative embodiments. Different materials or chemicals may be used; steps can be combined, modified or added; the order of steps can be modified; other shapes or structures can be used, etc.

Droplet-lens formation on MEMS resonator using polymer-jet printing technology requires a very flat, optically transparent surface integrated on a MEMS resonator. Our design makes use of LPCVD-deposited silicon nitride thin-film membranes for this purpose (Step 6 above). As demonstrated in previous work, low tensile-stress (~250 MPa) LPCVD-deposited silicon nitride membranes are virtually flat (radius of curvature ~51 m) and physically very robust over a 5 mm-by-5 mm square. The silicon nitride membrane also shows an excellent spectral transmission in the visible region (75-95%). These excellent qualities make the membranes excellent choices as supports for microlenses.

Figure 7:
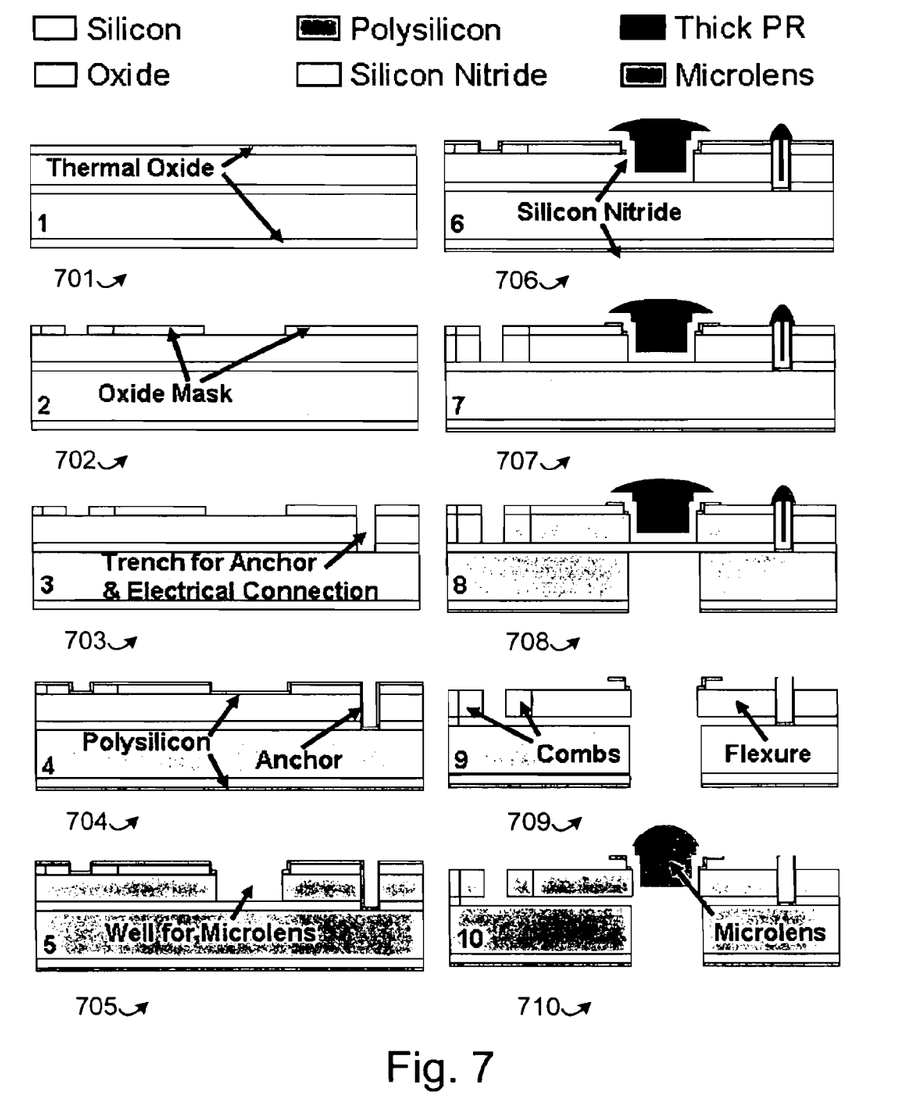
FIG. 7 illustrates the process of making a microlens array according to yet another embodiment of the invention.

The fabrication process of MEMS-microlens carriages is shown in FIG. 7. At 701 a 1 µm-thick thermal-silicon dioxide layer is grown on a SOI wafer. At 702 the layer is patterned to make a mask that will later define combs, flexures, supports, and lens frames. At 703 deep-reactive-ion-etch (DRIE) trenches that will be used to form anchors and electrical connections between the device layer and the handling layer of the SOI wafers are formed. At 704 a 0.5 µm-thick LPCVD polysilicon layer is deposited to create electrical contacts from the device layer to the handling layer (which serves as a GND). The polysilicon layer also protects the oxide mask. At 705 deep reactive ion etching (DRIE) is used to form circular trenches in the device layer. These trenches will serve as wells for droplet microlenses later.

At 706 a 2-µm-thick silicon nitride layer (tensile stress, ~250 MPa) is deposited using LPCVD. The layer is patterned. At 707 silicon parts (combs, flexures, supports, and lens frame) are formed with DRIE using the silicon dioxide mask layer formed at 702. At 708 the backside of the wafers is opened using DRIE to make clear apertures for microlenses. At 709 devices are released in concentrated HF. At 710 microlenses are formed using polymer-jet printing technology. The boundary of the trench defines the diameter of the lens.

Suitable devices may also be achieved by deviating from the specific values, measurements, parameters and other metrics and materials described above in connection with diagrams at 701-710.

In a preferred embodiment, droplet-lens formation on MEMS resonator using polymer-jet printing technology uses a very flat, optically transparent surface integrated on a MEMS resonator. Our design makes use of LPCVD-deposited silicon nitride thin-film membranes for this purpose (Step 6 above). Low tensile-stress (~250 MPa) LPCVD-deposited silicon nitride membranes are virtually flat (radius of curvature ~51 m) and physically very robust over a 5 mm-by-5 mm square. The silicon nitride membrane also shows an excellent spectral transmission in the visible region (75-95%). These excellent qualities make the membranes excellent choices as supports for microlenses.

The microlenses are precisely formed using polymer-jet printing technology within the 20 µm-deep circular wells (etched in the device layers of SOI wafers) having 2 µm-thick silicon-nitride-membrane floors. The boundaries of the circular wells precisely define the lens diameters, and the polymer's surface tension creates a high-quality optical surface. In a preferred embodiment, the polymer-jet printing head used is the Microfab MJ-AT-01-40, Epoxy Technology's uv-curable Epo-Tek OG146 is used as a microlens material. This material has a very low viscosity (less than 40 cps at room temperatures). In addition to the low viscosity, this epoxy possesses excellent optical properties: more than 95% spectral transmission in the 0.4-2 µm (visible to near-IR regions) range after curing and a refractive index of 1.51. In other embodiments, other suitable materials and techniques may be employed.

The optical properties such as a focal length of a microlens are adjusted by controlling its volume. Hence, for example, in order to fabricate a 2-mm-focal-length microlens on the MEMS-microlens carriage, we need to dispense $2.98 \times 10^{-11}$ m$^3$ (or $29.8 \times 10^{-9}$ L) of the microlens material. Since the polymer-jet printing head generates a droplet of $25 \times 10^{-12}$ L, it will require 1192 drops to fabricate one microlens on the MEMS carriage.

For our addressable microlens array, microlenses with designed focal length of 2.0 mm were fabricated. The twenty-five fabricated microlenses has an average effective focal length (EFL) of 2.09 mm, and the peak-to-peak variation in EFL is $\leq 7\%$.

The measured mechanical resonant frequencies of the prototype MEMS-microlens units 1 through 5 (microlens EFL=2.09 mm) are 1.31, 1.58, 1.98, 2.48, and 3.49 kHz, respectively. The corresponding Q-factors (microlens EFL=2.09 mm) are 65.4, 105.1, 142.1, 174.8, and 205.2. Within the same chip, the maximum variation in resonant frequencies of five identical units is found to be $\leq 5\%$. All units achieve 40 µm resonant excursions (i.e. ±20 µm) when applying actuation voltages equal to or lower than 44 volts alternating current (VAC) peak-to-peak +4 volts direct current (VDC). There was no noticeable mechanical crosstalk when observed under an optical microscope. Also within the same chip, deviations from a truly circular lens surface were measured and found to be minimal.

Resonant frequencies of the MEMS-microlens units according to the design of embodiments disclosed herein can typically range from 1.31 up to 3.49 kHz. With other design approaches the resonant frequencies can vary. The corresponding Q-factors with microlenses (EF L=2.09 mm) were between 65.4 and 205.2. All units achieve 40 µm resonant excursions (±20 µm) when applying actuation voltages (i.e., |VAC+VDC|) lower than 50V. Optically observed mechanical cross-talk between different units was negligible. The frequency selection of MEMS structures that is demonstrated in this project has clear advantages for various applications.

Although the invention has been described with reference to specific embodiments thereof, these embodiments are merely illustrative, and not restrictive of the invention. For example, although the use of (CCDs) is discussed, any suitable type of detector (e.g., complimentary metal oxide semiconductor (CMOS)) can be used. It should be apparent that the specific dimensions, physical measurements or other parameter values presented herein may be varied while still achieving desirable results.

Although a microlens array is used in a preferred embodiment, in general any type of MEMS structure can be subjected to resonant stimulation. For example, an array (or other collection) of mirrors, switches, sensors, etc., can have one or more of its structures subjected to a mechanical frequency and the resulting vibration of the structure can be detected.

Hartmann sensors, which have simple circular aperture (hole) arrays in place of microlens arrays, tend to show lower fill-factor/clear-aperture (~40%) than Shack-Hartmann sensors but operate using the same principles as Shack-Hartmann sensors. Hence, the methods/schemes/hardware implementations described in this document to improve the dynamic range, sensitivity, and spatial resolution of Shack-Hartmann sensors in this document can also be applied to Hartmann sensors. Other applications for aspects of the present invention are possible.

Aspects of the invention may be realized on different size scales than those presented herein. Although MEMS technology may be primarily presented, macro, nano or other designs, sizes and fabrication techniques may be used to advantage in different embodiments.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/FIGs. should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:
1. A microlens array comprising
a plurality of microlenses;
a plurality of detectors, wherein each detector is associated with a microlens;

means for applying a single vibration signal to the plurality of microlenses to cause vibration of a focal point of a particular microlens; and means for detecting the vibrating focal point by using a detector not associated with the particular microlens.

2. The microlens array of claim 1, farther comprising a lens-support carriage associated with each of the plurality of microlenses, wherein two or more lens-support carriages have different resonant frequencies;

means for vibrating a lens-support carriage at its resonant frequency to effect movement of the focal point of one or more of the microlenses; and drive means for generating a vibration of one or more of the lens-support carriages.

3. The microlens array of claim 2, wherein microlenses are arranged in a rectangular array in rows and columns, wherein two drive voltages per row are used to cause a selected lens-support carriage to vibrate.

4. The microlens array of claim 1, wherein the plurality of detectors includes an array of charge-coupled devices.

5. The microlens array of claim 1, further comprising one or more flextures associated with a particular microlens, wherein a flexture's geometry determines, at least in part, a resonant vibration frequency for the particular microlens.

6. The microlens array of claim 1, wherein the microlenses include Shack-Hartmann-type microlens array characteristics.

7. The microlens array of claim 1, wherein the plurality of microlenses is arranged in a microlens array having rectangular cells, wherein each microlens occupies every other cell in a row of cells, the microlens array comprising an actuator in each cell that that is not occupied by a microlens, wherein each actuator is associated with a microlens to move the microlens when the actuator is actuated; and a shifting mechanism for shifting the microlens array from a first position to a second position;

wherein the shifting mechanism shifts the microlens array by an amount equal to or less than a width of a cell (pitch) as a mean to improve effective clear aperture and wavefront measurement accuracy (especially spatial resolution) of the system; and wherein a focal point of one or more microlenses is detected in at least the first and second positions.

8. A method for identifying a structure in an microelectromechanical (MEMS) system (MEMS) having a plurality of structures, wherein a first structure has a first resonant frequency and wherein a second structure has a second resonant frequency, the method comprising:

applying a single vibrational signal to the first and second structures so that the first structure vibrates at the first resonant frequency while the second structure does not vibrate at the first resonant frequency;

detecting the vibration of the first structure; and outputting an indication of the identity of the first structure in response to detecting the vibration.

9. The method of claim 8, wherein the MEMS includes an array selected from a Hartmann array and a Shack-Hartmann array.

10. An optical system comprising:

a plurality of resonant units, each having a path that transmits light and having a resonant frequency that is unique among the plurality of resonant units; and an actuator configured to provide vibrational force to a plurality of the resonant units, wherein the force is provided at a resonant frequency selected to cause substantial vibration in only one of the resonant units.

11. The optical system of claim 10, where each light path includes a component selected from a pin hole, a microlens having a diameter between about 25 microns and about 4000 microns in diameter, or a macro lens.

12. The optical system of claim 10, where the actuator is selected from at least one of:

a voltage controlled electrostatic actuator including a voltage source and at least two conductors electrically coupled thereto, where the resonant components are positioned between the conductors, and where the voltage has a frequency corresponding to the selected frequency;

a current controlled electromagnetic actuator including a current source and at least one conductor electrically coupled thereto and configured to generate a magnetic field within the resonant components, the magnetic field having a frequency corresponding to the selected frequency; or a vibrator mechanically coupled to the plurality of resonant units and having a vibration frequency corresponding to the selected frequency.

13. The optical system of claim 10, where each resonant component further includes a material is selected from at least one of a piezoelectric material, a ferromagnetic material, or a thermo-pneumatic material.

14. The optical system of claim 10, further comprising:

a handling layer having a through hole for each light path;

a plurality of supports, each attached both to the handling layer and to one of the resonant units; and a set of fixed combs, each corresponding to one of the resonant units;

where each resonant unit includes: a lens frame; a flexure attached both to the lens frame and to one of the supports; and a moving comb attached to the lens frame and interleaved with the particular fixed comb corresponding to that particular resonant unit.

15. The optical system of claim 10, where the optical system further comprises:

at least one additional plurality of resonant units; and at least one additional actuator, where each additional actuator corresponds to one of the additional plurality of resonant units.

16. The optical system of claim 10, further comprising an electro-optic imaging device configured to generate an electrical signal indicative of images of a light beam that passes through the resonant units.

17. The optical system of claim 10, further comprising a second actuator configured to displace the entire plurality of resonant units with respect to the electro-optical imaging device.

18. The optical system of claim 17, further comprising:

a processor configured to receive the electrical signal, to determine the selected frequency and control the actuator to produce the selected frequency, and to identify which particular resonant unit generates which particular light beam image based on detecting vibration of the particular light beam image.

19. The optical system of claim 18, where the processor is further configured to determine a wavefront aberration of the light beam based on the electrical signal, thereby forming a Shack-Hartmann (SH) sensor.

20. The optical system of claim 19, further comprising:

an adaptive optical element having adjustable properties, where the adaptive optical element is positioned within the light beam prior to the resonant units; and a beam splitter, positioned within the light beam between the adaptive optical element and the resonant units, and configured to split the light beam into a component that is incident on the resonant units and a second component;

where the processor controls the adjustable properties based on the determined wavefront aberration so as to control wavefront aberration in the second component.

21. The optical system of claim 19, further comprising:

a light source configured to generate the light beam;

where the optical system is adapted for use with an optical element under test that is positioned within the light beam between the light source and the resonant units; and where the processor is further configured to determine optical properties of the optical element under test based on the determined wavefront aberration.

22. An optical system comprising:

means for forming a plurality of images of a light beam that is incident of the forming means, wherein each image is associated with an image area;

means for inducing vibration in a selected subset of the images by applying a single vibration signal to the plurality of images; and means for detecting which of a particular one of the images is generated from a particular location on the forming means based on detecting the vibration outside of the image area associated with the particular one of the images.

23. The optical system of claim 22, further comprising:

means for displacing the images;

means for generating an electrical signal indicative of the images;

means for determining a wavefront aberration of the light beam based on the electrical signal;

means for controlling the wavefront aberration of the light beam based on the determined wavefront aberration;

means for generating the light beam; and means for determining properties of an optical element under test through which the light beam passes, where the determining is based on the determined wavefront aberration.

* * * * *